United States Patent

Yokoyama

[11] Patent Number: 6,011,225
[45] Date of Patent: Jan. 4, 2000

[54] CONSTRUCTION OF A LEVER SWITCH FOR A VEHICLE

[75] Inventor: Toshiaki Yokoyama, Tokyo, Japan

[73] Assignee: Niles Parts Co., Ltd., Japan

[21] Appl. No.: 09/120,183

[22] Filed: Jul. 22, 1998

[30] Foreign Application Priority Data

Jul. 31, 1997 [JP] Japan .................................. 9-218994

[51] Int. Cl.$^7$ .................................................. F16H 21/52
[52] U.S. Cl. ........................... 200/61.27; 200/61.54; 200/336
[58] Field of Search ..................... 200/61.54, 61.28, 200/61.56, 336, 567, 564, 61.27

[56] References Cited

U.S. PATENT DOCUMENTS

| | | | |
|---|---|---|---|
| 4,810,839 | 3/1989 | Chretien | 200/61.54 X |
| 5,259,262 | 11/1993 | DuRocher et al. | 200/61.54 X |
| 5,804,784 | 9/1998 | Uchiyama et al. | 200/61.54 |

*Primary Examiner*—Renee S. Luebke
*Attorney, Agent, or Firm*—Rader, Fishman & Grauer; Ronald P. Kananen

[57] ABSTRACT

A lever switch includes a pivoting knob 4, an inner lever 22 having the pivoting knob 4 fixed at an extremity thereof and a manipulation rod at another extremity thereof, and a second lever 6 having a pipe-shaped portion, through which a shaft bar of the inner lever passes. The inner lever 22 is formed in one body with the manipulation rod, which has a toothed-wheel-shaped engaging portion 22b at another extremity portion. The toothed-wheel-shaped engaging portion has a thickness of teeth t1 on the side of a shaft bar 22c that is greater than a thickness of teeth t2 on the side of a case. The engaging portion 22b is formed so as to protrude in a direction inclined with respect to a center line of the shaft bar 22c.

4 Claims, 6 Drawing Sheets

6,011,225

CONSTRUCTION OF A LEVER SWITCH FOR A VEHICLE

BACKGROUND OF THE INVENTION

1. Field of the Invention

The present invention relates generally to switches for vehicles and, in particular, to a construction of a lever switch for a vehicle, in which a pivoting knob is disposed at an extremity of a lever.

2. Description of the Related Art

A conventional lever switch for a vehicle is disclosed, for example, in U.S. Pat. No. 5,259,262. This conventional lever switch has a pivoting manipulation knob mounted by inserting an extremity of a shaft into it, and a driving toothed-wheel mounted by inserting another extremity of the shaft into the driving toothed-wheel. With this construction, movement of the pivoting knob is transmitted to a switching contact portion through the driving toothed-wheel.

However, the conventional toothed-wheel described above is a member separated from the shaft, which increases the number of parts and the number of mounting steps, giving rise to an increased cost of manufacturing the lever switch.

SUMMARY OF THE INVENTION

An object of the present invention is to decrease the number of parts and the number of mounting steps of a lever switch by forming a lever and a toothed-wheel-shaped manipulation rod in one body, thereby reducing the fabrication cost.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch is provided that includes a pivoting knob, an inner lever having the pivoting knob fixed at an extremity thereof, and a manipulation rod at another extremity thereof, and a second lever having a pipe-shaped portion, through which a shaft bar of the inner lever is made to pass. The inner lever is formed in one body with the manipulation rod, and the manipulation rod has a toothed-wheel-shaped engaging portion at another extremity portion.

According to another aspect of the present invention, the toothed-wheel-shaped engaging portion has a plurality of teeth each having portions of different thicknesses (t1 and t2).

According to another aspect of the present invention, the thickness (t1) of the teeth of the toothed-wheel-shaped engaging portion on the side of the shaft bar is greater than the thickness (t2) of the teeth on the side of a case.

According to yet another aspect of the present invention, the toothed-wheel-shaped engaging portion of the inner lever is formed so as to protrude in a direction inclined with respect to a center line of the shaft bar.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
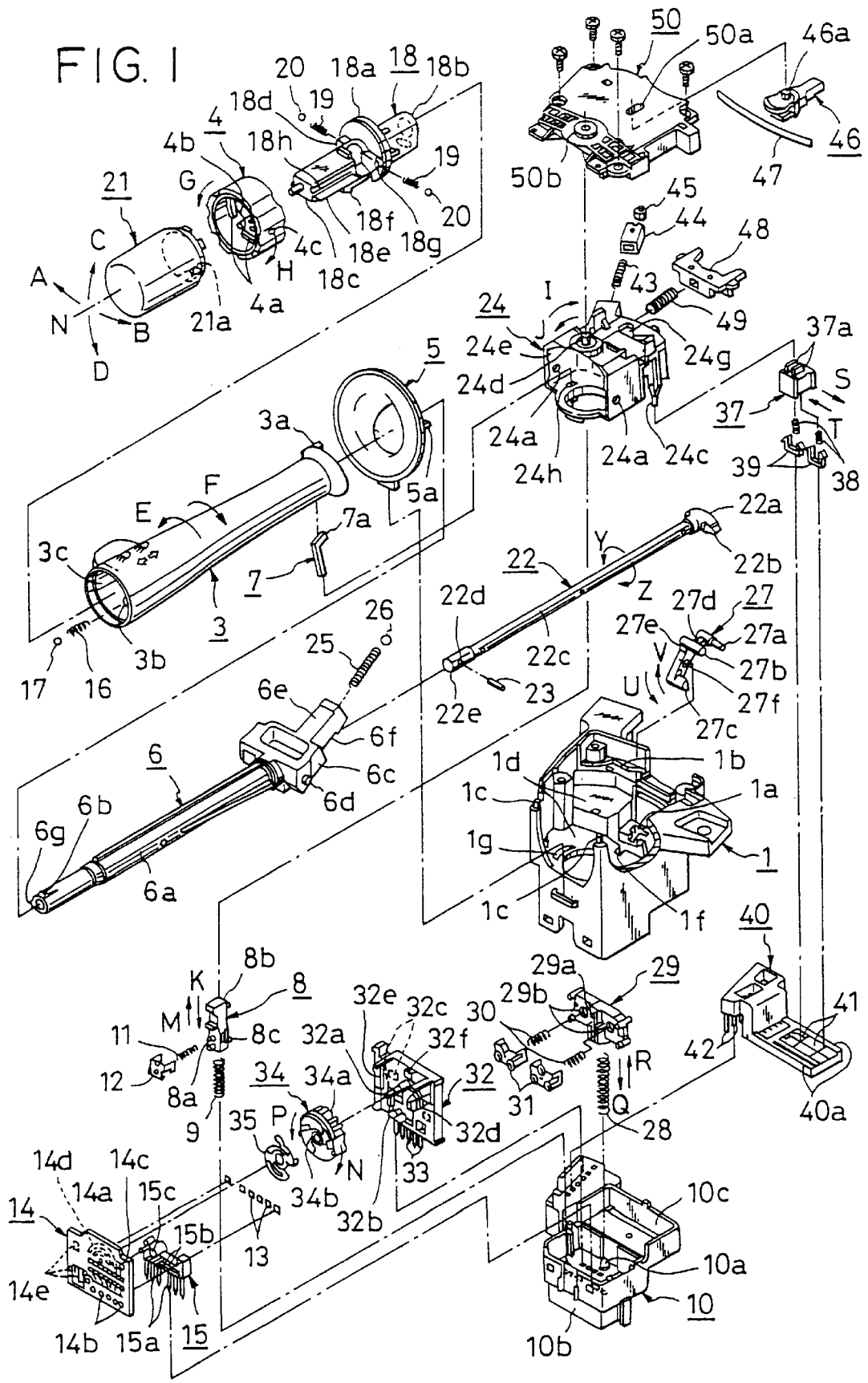
FIG. 1 is an exploded perspective view, partially cut-away, showing a lever switch according to a preferred embodiment of the present invention.

A preferred embodiment of the present invention will now be described in detail with reference to FIGS. 1 to 8 of the accompanying drawings.

Reference numeral 1 in the drawings depicts a case mounted, for example, on the left side of a body (not shown) of a combination switch for an automobile. The case 1 and the combination switch 2 indicated in FIGS. 1 to 3 relate to a switch mounted in the neighborhood of a steering wheel, which is on the left side of a body of an automobile. Hereinbelow, as an exemplary mode for carrying out the invention, a switch for a left steering wheel automobile will be described in detail. However, in the case where the switch is to be used for a right steering wheel automobile, the present invention can be applied by modifying the case 1, the combination switch 2 and all the parts described later into symmetrically inverted forms.

The combination switch body has a cylindrical pipe, through the center of which a steering shaft (not shown) passes. The case 1 is mounted, for example, on the left side of the combination switch body by inserting the case 1 into the body from the left direction and securing the case 1 to a steering column (not shown) by means of screws.

The combination switch 2 has, for example, functions of a turn signal switch, a passing switch, a main-dimmer switching-over switch, and a wiper washer switch. The combination switch 2 has a function of the turn signal switch to energize direction indicator lamps intermittently, when a first lever 3 is operated in a direction right or left, as indicated by an arrow A or B.

The combination switch 2 has a function of the passing switch to energize headlamps temporarily, when the first lever 3 is operated in an upward direction indicated by an arrow C. Further the combination switch 2 has a function of the main-dimmer switch, which switches between "main" and "dimmer" modes of the headlamps, when the first lever 3 is operated in an upward or downward direction, as indicated by an arrow C or D.

Still further the combination switch 2 has a function of the wiper washer switch to make a wiper work three or four times and eject washer liquid toward a front glass, when the first lever 3 is operated by pivoting in a direction indicated by an arrow E. A pivoting knob 4 disposed adjacently to the extremity side of the first lever 3 functions as the wiper switch to make the wiper work with various speeds or intermittently, when it is operated by pivoting in a direction indicated by an arrow G or H.

Figure 2:
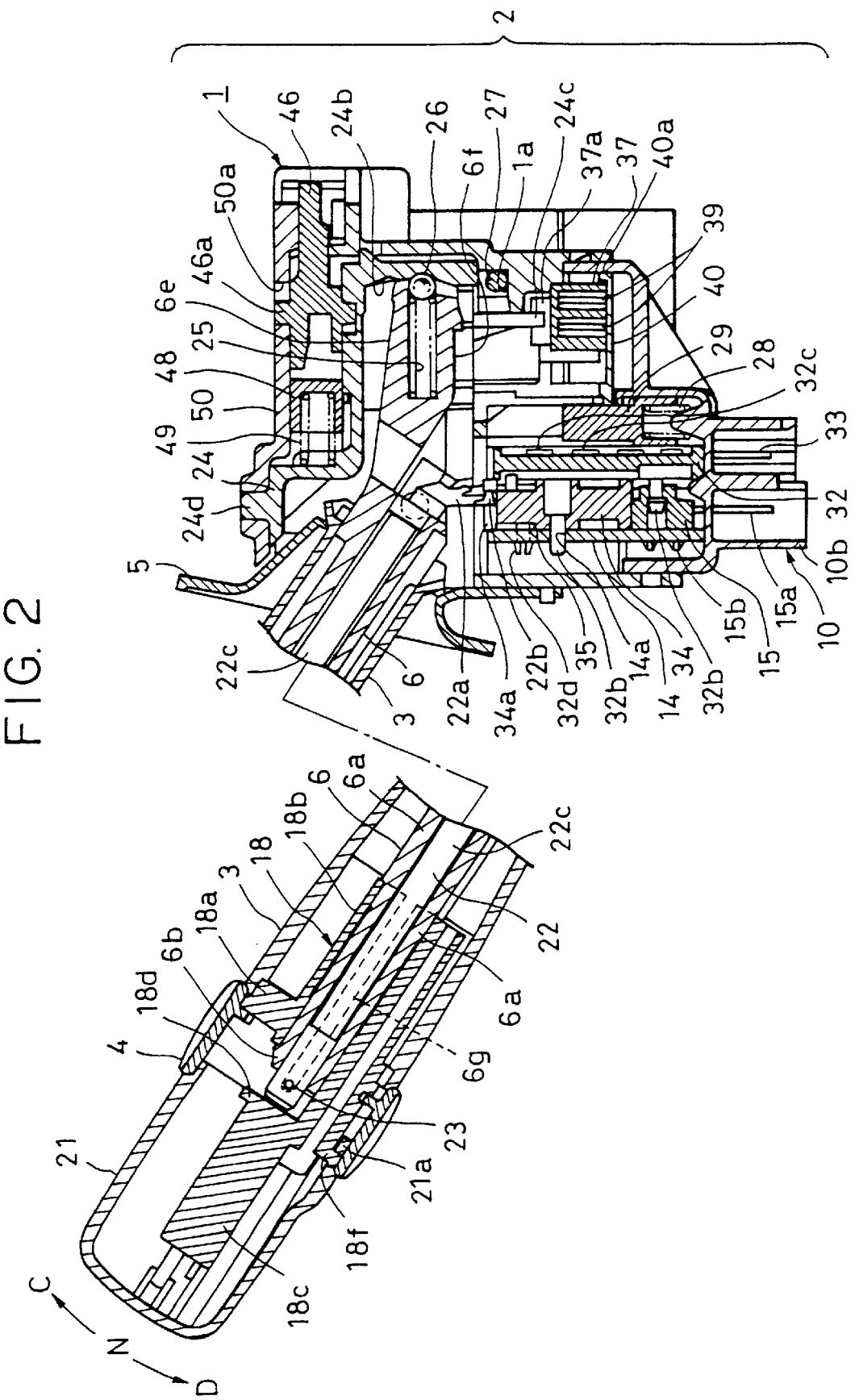
FIG. 2 is an enlarged longitudinal cross-sectional view of a principal part of the lever switch shown in FIG. 1.

The first lever 3 has an approximately pipe-shaped form having a larger diameter at an end portion on the side of the pivoting knob 4 and a smaller diameter at another end portion on the side of the case 1, as indicated in FIGS. 1 and 2. The first lever 3 is movably engaged with a boot 5 opened in a trumpet shape around the other end portion on the side of the case 1, and a second lever 6 consisting of a pipe-shaped body is inserted into an opening thus formed. The first lever 3 is pivoted in a direction indicated by an arrow E around shaft portions 6d of the second lever 6 and returned automatically in another direction indicated by an arrow F to operate the wiper washer switch.

On an end portion of the first lever 3 on the side of the case 1 there is disposed a manipulation rod 3a contacted with pressure with a head portion 7a of a push rod, which moves a first movable piece 8 in an upward or downward direction, as indicated by an arrow K or M, so as to protrude therefrom. The operation rod 3a consists of a protruding piece formed on the other end portion of the first lever 3, which is pivoted together with the first lever 3 so as to thrust the head portion 7a of the push rod 7 in order to move it upward or downward.

The push rod 7 is an approximately L-shaped metal bar member having the head portion 7a, as indicated in FIG. 1. The push rod 7 is supported by being inserted into a pipe-shaped portion 24h formed on a bottom surface of an opening portion 24e of a movable base plate 24. The push rod 7 is movable freely upward and downward within the pipe-shaped portion 24h. The pipe-shaped portion 24h, into which the push rod 7 is inserted, is disposed pivotably in a horizontal direction by insertion into a through hole 1g formed in an inner bottom plate 1d of the case 1. The push rod 7 is pushed by the first movable piece 8, which is energized by a returning spring 9 so that the head portion 7a is always thrust with pressure with the operation rod 3a.

The boot 5 is opened in an approximately trumpet shape, as indicated in FIGS. 1 and 2. The boot 5 is mounted on the case 1 in order that no persons in the vehicle can see a base end portion 6c of the second lever 6 and the movable base plate 24. The boot 5 is fixed by putting it between the case 1 and a covering member 50. Protruding portions 1c formed on the case 1 are inserted into through holes 5a disposed on the lower surface of the rear side of the boot 5.

The first movable piece 8 is engaged with the push rod 7 made of metal or the like at the upper portion, as indicated in FIG. 1. The first movable piece 8 is disposed on an inner bottom of an opening portion 10a in a pole-plate 10 through a returning spring 9 put on a lower surface thereof and engaged with a movable contact plate 12 through a contact spring 11 put on a side surface thereof. On the first movable piece 8 there are formed a blind hole 8a on a side surface thereof on the side of a first base plate 14, in which the contact spring 11 is completely sunk, and a blind hole (not shown) on the lower surface, in which the returning spring 9 is completely sunk.

On an upper surface of the first movable piece 8 there is formed a wide head portion 8b, which is contacted with a lower end portion of the push rod 7. On the first movable piece 8 there are formed a plurality of guiding protrusions 8c, which are engaged with a guiding groove 32e formed vertically in a second base plate 32, on upper and lower parts of a side surface thereof on the side of the second base plate 32. When the first lever 3 is operated by pivoting, the first movable piece 8 is pushed by the push rod 7 and guided by the guiding groove 32e so as to be moved upward or downward in a direction indicated by arrows K or M. When the movable contact plate 12 is brought into contact with a fixed contact 14e, the switch is turned on so that the wiper washer is made to work.

The first base plate 14 is a printed board, on which fixed contacts 14d, 14e are printed and electronic elements 13 and soldering portions 15b of a terminal plate 15 are soldered. The fixed contacts 14d, 14e may consist of metal pieces fixed by caulking on the first base plate 14. The electronic elements 13 are resistors and the like constructing an intermittent wiper circuit or the like. The terminal plate 15 is formed by inserting the soldering portions 15b, each of which is formed in one body with a terminal 15a. The first base plate 14 and the terminal plate 15 are inserted into the opening portion 10a and supported by putting them between a lower surface of the inner bottom plate 1d of the case 1 and a wall thereof, as indicated in FIG. 2. Further the terminals 15a are inserted into a connector portion 10b to be fixed.

The first base plate 14 consists of, for example, a printed board, in which there are formed a shaft hole 14a, into which a shaft bar 32a (described below) is inserted to be held therein, through holes 14b, into which the soldering portions 15b of the terminals 15a are inserted, and a through hole 14c, with which an engaging thrusting bar 32b formed on the second base plate 32 is engaged. On the front surface side of the first base plate 14, where the first movable piece 8 is disposed, there are secured the fixed contacts 14d, 14e and the terminal plate 15. The fixed contacts 14d are disposed in an arc shape around the shaft hole 14a in approximately two rows. The fixed contacts 14e are disposed at such positions that the movable contact plate 12 is brought into contact therewith, when the first lever 3 is operated by pivoting so that it descends.

The terminal plate 15 is so formed that the terminals protrude from the lower surface thereof, that the soldering portions 15b are each formed in one body with each of the terminals 15a, and that the terminals 15a and the soldering portions 15b are inserted into the terminal plate, as indicated in FIGS. 1 and 2. A through hole 15c, with which the shaft bar 32a protruding from the second base plate 32 is engaged, is formed approximately at the center of the terminal plate 15. The terminal plate 15 is engaged with the inner bottom of the opening portion 10a at the lower end portion and secured by inserting the terminals 15a into the connector portion 10b, by soldering the soldering portions 15b to the through holes 14b formed in the first base plate 14, and by inserting the shaft bar 32a into the through hole 15c.

In the first lever 3, there is formed a blind hole 3b, in which a steel ball 17 and a node spring 16 are sunk completely, inside of an opening portion 3c on the side of the pivoting knob 4, as indicated in FIG. 1. The steel ball 17 is energized by the mode spring 16 so as to be contacted with pressure with a node groove (not shown) formed on a side surface of a flange portion 18a disposed approximately at the center of a fixing body 18 on the side of the first lever 3 and to return the first lever 3 automatically.

The fixing body 18 is disposed inside of the fixed knob 21, the pivoting knob 4 and the first lever 3, as indicated in FIG. 2. The flange portion 18a closes the opening portion 3c of the first lever 3. At the same time, the flange portion 18a is so disposed that the node spring 19 and the steel ball 20 can be made to come out from and move into the pivoting knob 4 freely. A cylindrical pipe-shaped portion 18b is inserted into the opening portion 3c of the first lever 3. An extremity of a pipe-shaped portion 6a of a second lever 6 is mounted on the pipe-shaped portion 18b by insertion. An engaging portion 18c is a place, to which the fixed knob 21 is secured, and is disposed within the fixed knob 21.

The fixing body 18 is secured to the second lever 6 by an elastic engaging nail 6b disposed at an extremity of the shaft pipe-shaped portion 6a, which is inserted into the first lever 3. The cylindrical pipe-shaped portion 18b is engaged with an edge of a cavity 18d disposed adjacently to the flange portion 18a. A key 6g is engaged with a key groove 6g formed within the cylindrical pipe-shaped portion 18b. The first lever 3 is disposed freely pivotably on the second lever 6 owing to the fact that the pipe-shaped portion 6a is inserted into the first lever 3 and that there are disposed the base end portion 6c at one end and the flange portion 18a at another end.

Figure 4:
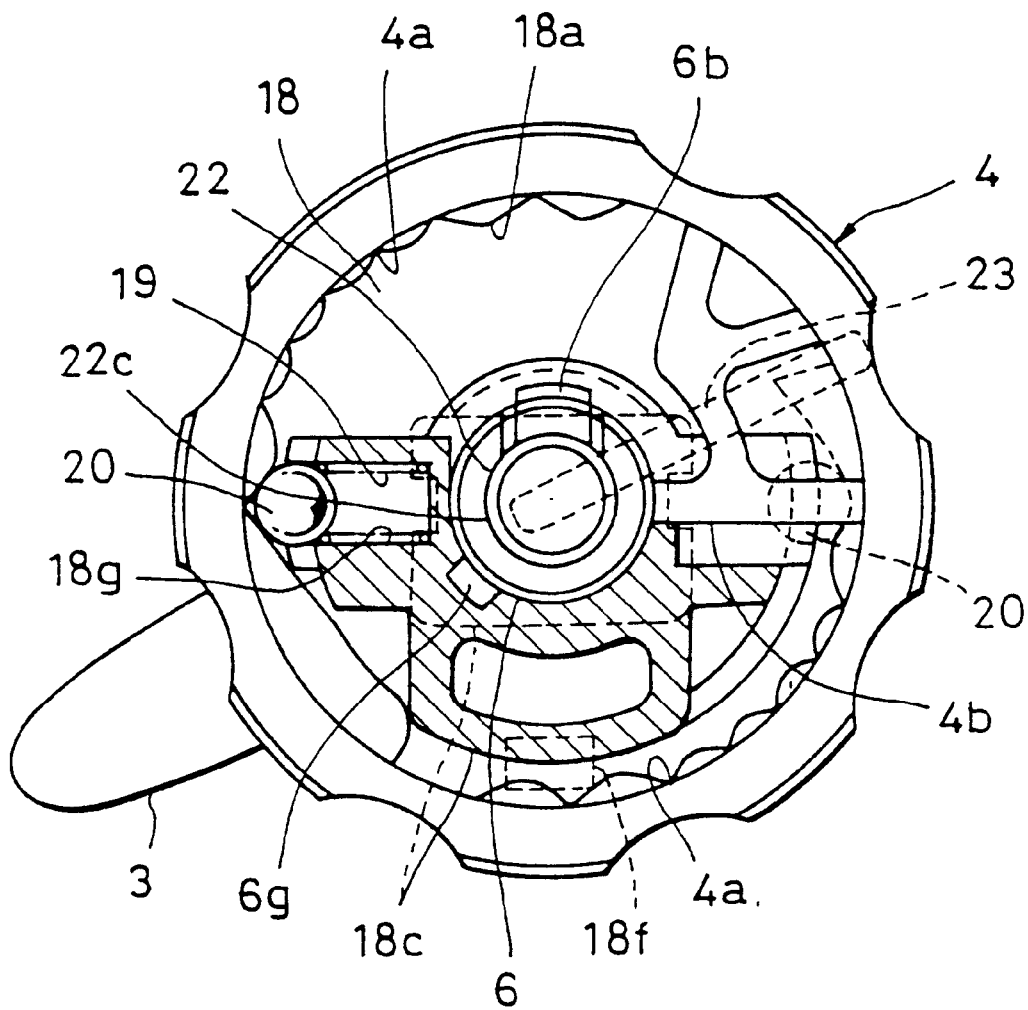
FIG. 4 is a diagram for explaining a state where a pivoting knob of the lever switch is mounted.

In an outer peripheral portion of the flange portion 18a, or in the neighborhood thereof, there is formed a blind hole 18g, into which the node spring 19 and the steel ball 20 are inserted, as indicated in FIGS. 1 and 4. The pivoting knob 4 is disposed around the blind hole 18g. On the engaging portion 18c, there are formed a protruding piece 18e engaged with a guiding groove (not shown) formed within the fixed knob 21, a nail 18f engaged with an engaging piece 21a disposed at an end of the opening of the fixed knob 21, and a transversal groove 18h guiding a protrusion 4b of the pivoting knob 4 to the cavity 18d.

As indicated in FIGS. 1 and 2, the cylindrical pipe-shaped portion 18b is movably inserted into the opening portion 3c of the first lever 3, the pipe-shaped portion 6a of the second lever 6 passes therethrough, and a key groove, with which a key 6g is engaged, is formed thereon. The cavity 18d is disposed adjacently to an end portion of the cylindrical pipe-shaped portion 18b. The cavity 18d is a blind hole, in which a protrusion 4b formed on the pivoting knob 4 is disposed, so that the pivoting knob 4 can be pivoted only in a predetermined angle region. The nail 18f is formed on the lower surface of the fixing body 18 in order that it is engaged with the engaging piece 21a of the fixed knob 21 to fix the fixed knob 21 on the fixing body 18.

The blind hole 18g is formed, for example, in an outer peripheral portion of the flange portion 18a, or in the neighborhood thereof. The transversal groove 18h is formed in order to guide the protrusion 4b to the interior of the cavity 18d. The transversal groove 18h is a groove disposed continuously from an end portion of the fixing body 18 to the cavity 18d.

On the inner surface of the pivoting knob 4, as indicated in FIGS. 1 and 4, there are formed two node grooves 4a, which are each contacted with pressure by two steel balls, and a protrusion 4b, which is slidingly contacted with an upper half side surface of the flange portion 18a and disposed in the cavity 18d. The pivoting knob 4 is secured to a third inner lever 22 by the fact that, in a state that a hole 22d formed in an extremity portion 22e, into which a pin 23 is inserted, is disposed in the cavity 18 of the fixing body 18, the pin 23 is made to pass through the through hole 4c in the pivoting knob 4 to be inserted into the hole 22d so as to be mounted thereon. The pivoting knob 4 is pivoted together with the third lever 22, and the pivoting region thereof is limited by the fact that the protrusion 4b collides with the inner wall of the cavity 18d.

As indicated in FIGS. 1 and 2, the shaft parts 6d engaged with the shaft holes 24a formed in the movable base plate 24 are formed so as to protrude on both sides of the base end portion 6c of the second lever 6. The second lever 6, the first lever 3 and the third lever 22 pivot around the shaft portions 6d in directions indicated by the arrows C and D. On the base end portion 6c there are formed the shaft portions 6d on one side so as to protrude therefrom, and a node body disposing protrusion 6e on another side, in which a node spring 25 and a steel ball 26 are disposed by insertion. The steel ball 26 is energized by the node spring 25 and is brought into contact with pressure with the node groove 24b formed in the inner wall of the movable base plate 24, as indicated in FIG. 2.

On the lower side of the node body disposing protrusion 6e there is formed a thrusting surface 6f thrusting a contacting portion 27b of an arm body 27. When the first lever 3 is operated in a direction indicated by the arrow C or D, the second lever 6 is moved upward or downward around the shaft portions 6d to pivot the arm body 27.

The arm body 27 consists of a shaft portion 27a, the contacting portion 27b, a thrusting portion 27c, as well as a first arm 27d, a second arm 27e, and a third arm 27f connecting them with each other. The arm body 27 is supported pivotably by engaging the approximately pillar-shaped shaft portion 27a with a shaft supporting groove 1a formed in the case 1, and by putting the arm body 27 between the case 1 and the lower surface of the movable base plate 24.

The shaft supporting groove 1a is a blind hole having an approximately T-shape, in which the shaft portion 27a of the arm body 27 and the first arm 27d in the neighborhood of the shaft portion 27a are sunk. The groove 1a is formed at a corner on the inner bottom plate 1d of the case 1. In the case 1, there is formed a through hole 1e in the neighborhood of the shaft supporting groove 1a, into which the third arm 27f of the arm body 27 and a protrusion 24c of the movable base plate 24 are inserted pivotably to be disposed therein. In the through hole 1e there is formed a cut-off portion 1f at a place opposite to the shaft supporting groove 1a, through which the third arm 27f passes and with which a thrusting portion 27c is brought into contact.

The contacting portion 27b is thrust by the thrusting portion 6f and has a pillar shape. The thrusting portion 27c is a member, which moves the second movable piece 29 energized by a spring 28, upward and downward in directions indicated by arrows R and Q against the force of the spring 28. The thrusting portion 27c is a pillar-shaped piece protruding from the extremity of the third arm 27f. The thrusting portion 27c is disposed between the lower surface of the inner bottom plate 1d and the second movable piece 29. The second movable piece 29 energized by the spring 28 is always contacted with pressure with the thrusting portion 27c.

Figure 8:
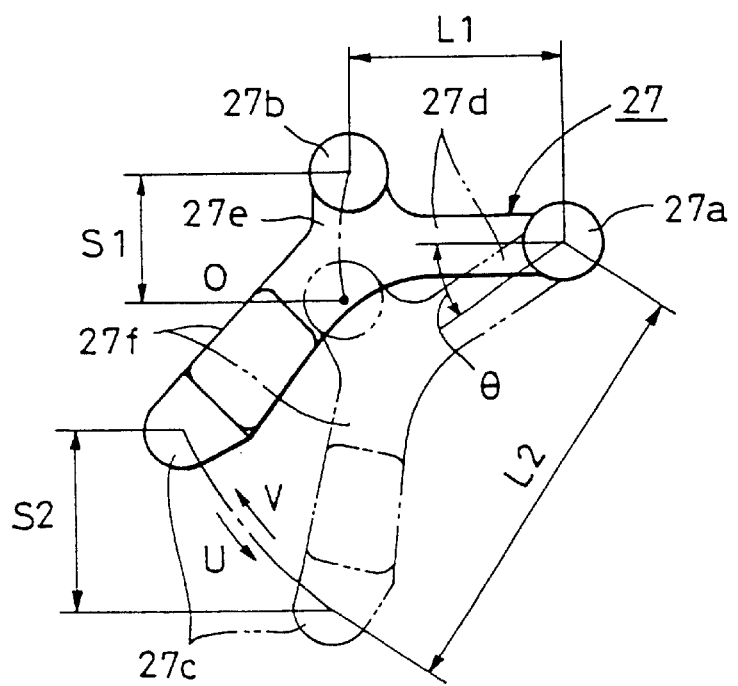
FIG. 8 is a diagram for explaining the pivoting movement of an arm body of the lever switch.

The first arm 27d is disposed in the case 1 in a state that it extends in a horizontal direction from the shaft portion 27a. The second arm 27e descends just downward from the contacting portion 27b and intersects the first arm 27d and the third arm 27f at a position therebetween. The third arm 27f extends obliquely upward from the thrusting portion 27c to the intersection of the first arm 27d and the second arm 27e. The arm body 27 is so formed that L1<L2, for example, as indicated in FIG. 8, wherein L1 represents the length from the shaft portion 27a to the contacting portion 27b, and L2 represents the length from the shaft portion 27a to the thrusting portion 27c.

In this way, when the arm body 27 is pushed by the thrusting surface 6f and pivoted by an angle of θ° in a direction indicated by an arrow U or V around the shaft portion 27a, which is at an end thereof, the thrusting portion 27c at another end of the arm body 27 is moved over a longer distance than the contacting portion 27b. That is, the stroke, i.e., the displacement distance of the second movable piece 29, over which it is moved upward and downward in the directions indicated by the arrows Q and R, is enlarged by interposition of the arm body 27 between the second lever 6 and the second movable piece 29.

In the second movable piece 29 there is formed a blind hole 29b on a side surface, as indicated in FIG. 1, into which a contact spring 30 is inserted so that the contact spring 30 can be moved freely into and out of the blind hole 29b. The second movable piece 27 holds movable contact plates 31 through the contact springs 30. Another blind hole is formed on the lower surface of the second movable piece 29, as indicated in FIG. 2, into which the spring 28 is inserted so that it can move freely into and out therefrom. When the first lever 3 is operated in the direction indicated by the arrow C or D, the second movable piece 29 is pushed by the arm body 27 to be moved upward or downward so that switches are opened or closed to effect switching-over of "main," "dimmer" and "passing" modes. When the second movable piece 29 is moved upward and downward in the directions indicated by the arrows Q and R, the movable contact plates 31 are brought into contact with the fixed contacts 32c to turn the switches ON.

On the second base plate 32, as indicated in FIG. 1, there are disposed the fixed contacts 32c on a side surface on the side of the second movable piece 29, and there are formed guiding grooves 32f, with which guiding protrusions 29a of the second movable piece 29 are engaged. In the second base plate 32 there are formed a shaft bar 32a, engaging thrusting bars 32b, 32d, and a guiding groove 32e on a side surface on the side of the first base plate 14. On the second base plate 32, terminals 33 connected electrically with the fixed contacts 32c protrude from the lower surface thereof. The terminals 33 are formed by insertion into the second base plate 32.

As indicated in FIGS. 1 and 2, the second base plate 32 is mounted on an inner bottom of an opening portion 10a of a pole plate 10 and held by the bottom surface of the opening portion 10a and the lower surface of the inner bottom plate 1d of the case 1. The second base plate 32 is secured by covering the opening portion 10a by the case 1 at the same time. Further, the second base plate 32 is secured in the pole plate 10 more solidly by the fact that the terminals 33 are mounted by insertion on the connector portion 10b of the pole plate 10, that the shaft bar 32a is engaged with the shaft hole 14a in the first base plate 14, that the engaging thrusting bar 32b is engaged with the through hole 15c, and that the engaging thrusting bar 32d is engaged with the through hole 14c.

The shaft bar 32a and the engaging thrusting bars 32b and 32d are formed in one body together with the second base plate 32, for example, by using resin or the like. The length of the shaft bar 32a is so determined that the extremity thereof passes through the shaft hole 14a and protrudes from the first base plate 14. Further, the shaft bar 32a may be a shaft made of metal secured to the second base plate 32. Still further, the shaft bar 32a and the engaging thrusting bars 32b and 32d formed on the second base plate 32 so as to protrude therefrom, may be formed on the first base plate 14 and the terminal plate 15, which are at positions opposite to the second base plate 32. The shaft hole 14a and the through hole 14c formed in the first base plate 14 and the through hole 15c formed in the terminal plate 15 may be formed in the second base plate 32.

The engaging thrusting bars 32b and 32d have, for example, a same shape. A splitting slit is formed at the center of the extremity of each of them so that they are elastic and are engaged with edges of the through holes 15c and 14c. The engaging thrusting bar 32b is formed so as to protrude from an upper portion of the second base plate 32 toward the first base plate 14. The engaging thrusting bar 32d is formed so as to protrude from a lower portion of the second base plate 32 toward the terminal plate 15.

As indicated in FIGS. 1 and 2, the fixed knob 21 is secured to the fixing body 18 by engaging it with the engaging portion 18c of the fixing body 18 and by engaging the engaging piece 21a with the thrusting piece 18c. In this way, the fixed knob 21, the fixing body 18, and the second lever 6 are moved in one body all together.

As indicated in FIGS. 1 and 2, the third lever 22 has the pivoting knob 4 secured to a first rear end thereof by means of the pin 23, and has the toothed-wheel-shaped manipulation rod 22a at a second front end thereof. The shaft bar 22c of the third lever 22 is inserted pivotably into the pipe-shaped portion 6a of the second lever 6, and the extremity portion 22e is disposed within the cavity 18d of the fixing body 18.

Figure 5:
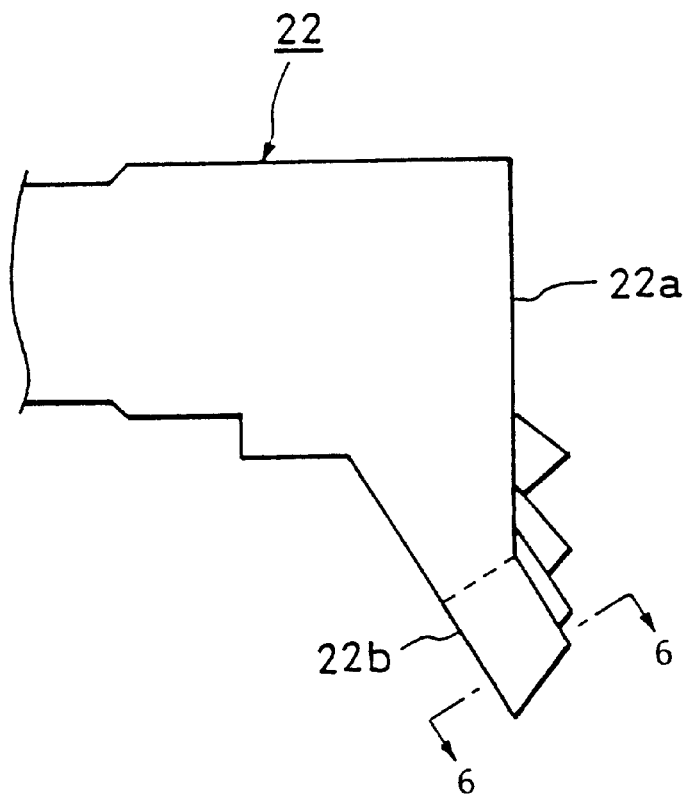
FIG. 5 is an enlarged front view of a manipulation rod of a third lever of the lever switch.
Figure 6:
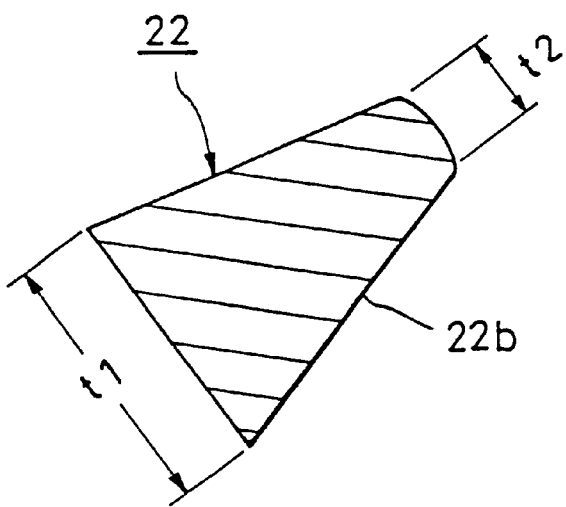
FIG. 6 is an enlarged cross-sectional view, as viewed in a direction indicated by arrows 6—6 in FIG. 5.
Figure 7:
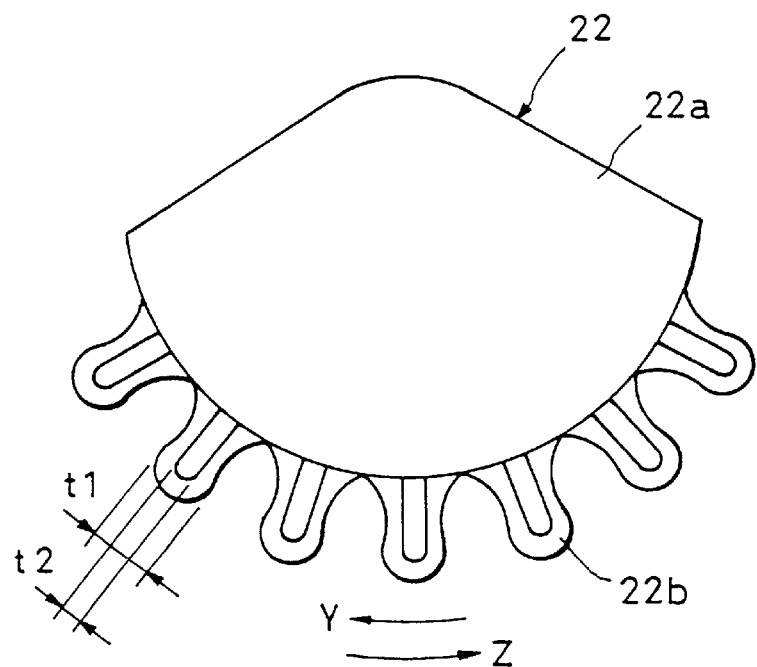
FIG. 7 is an enlarged side view of a third lever of the lever switch according to the present invention.

The manipulation rod 22a is formed in one body with the third lever 22 at an end thereof. The manipulation rod 22a is a transmitting member having a toothed-wheel-shaped engaging portion 22b having approximately a sector shape, as indicated in FIG. 7. As indicated in FIGS. 2 and 5, the engaging portion 22b disposed at the extremity portion of the manipulation rod 22a protrudes radially outwardly and forwardly from the manipulation rod 22a in a direction inclined with respect to a center line of the third lever 22. The toothed-wheel-shaped engaging portion 22b is so formed that:

$$t1 > t2$$

as indicated in FIGS. 6 and 7, where t1 represents the thickness of teeth on the rear side facing the first rear end of the third lever 22, while t2 represents the thickness of teeth on the front side facing away from the first rear end of the third lever. That is, the thickness of teeth t1 is greater than the thickness of teeth t2. When the first lever 3 is at the neutral position, as indicated in FIG. 2, the manipulation rod 22a is engaged in a perpendicular direction with the toothed-wheel-shaped engaging portion 34a of the third movable piece 34.

Figure 3:
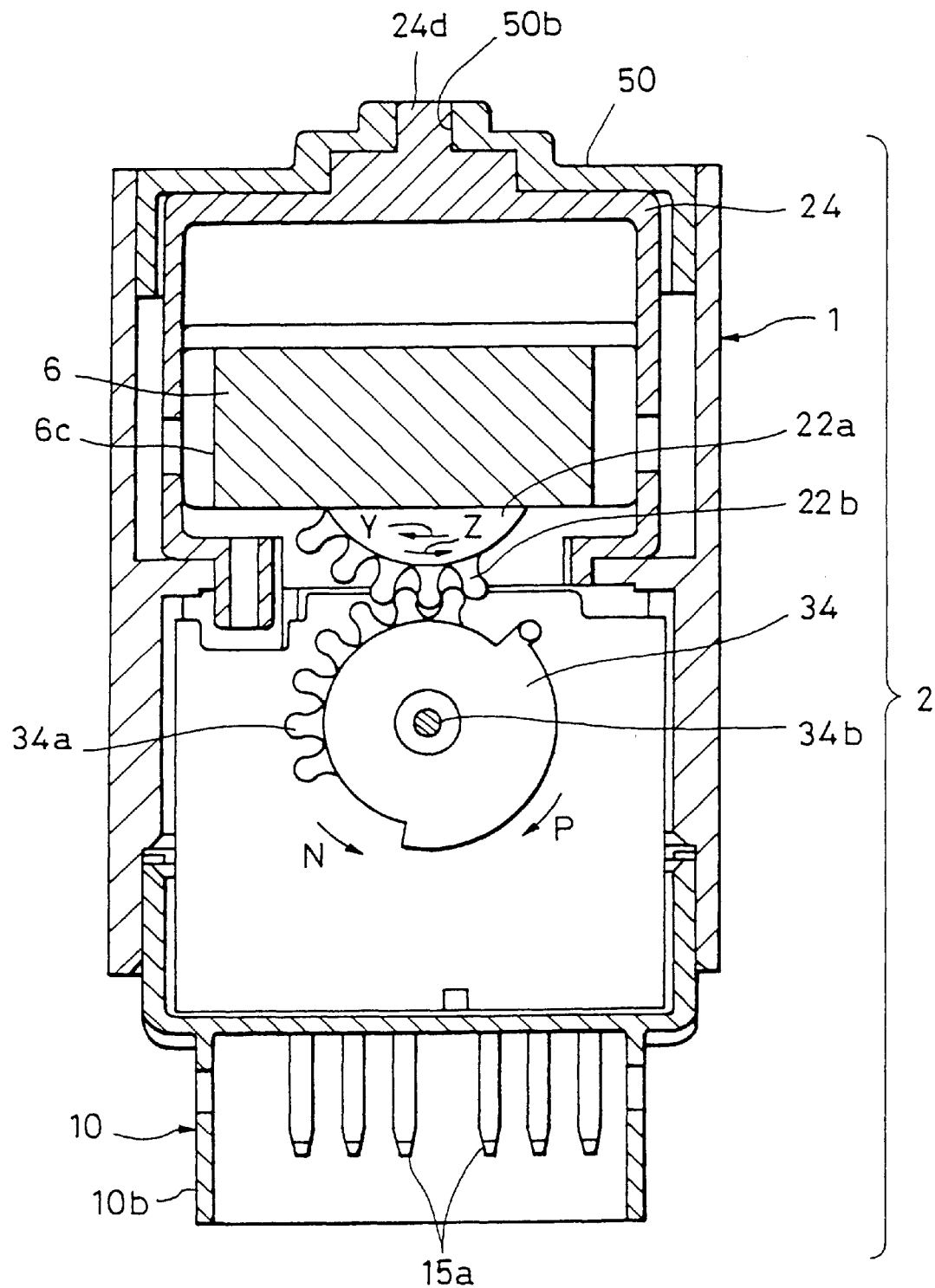
FIG. 3 is an enlarged cross-sectional view of another principal part of the lever switch shown in FIG. 1, showing an engaging state of engaging portions.

When the pivoting knob 4 is operated by pivoting in a direction indicated by an arrow G or H, as indicated in FIG. 3, the manipulation rod 22a is pivoted in a direction indicated by an arrow Y or Z, which makes the third movable piece 34 move in a direction indicated by an arrow N or P. Further, when the first lever 3 is operated by pivoting in the direction indicated by the arrow C or D, the manipulation rod 22a is engaged with the engaging portion 34a of the third movable piece 34 in a state that the engaging portion 22b is inclined.

As indicated in FIGS. 1 and 3, the third movable piece 34 is a toothed-wheel-shaped pivoting member having the engaging portion 34a formed in an upper peripheral portion thereof. The third movable piece 34 is supported pivotably around a shaft by the fact that the shaft hole 34b is formed at the center, that the shaft bar 32a of the second base plate 32 is inserted into the shaft hole 34b, and that the extremity of the shaft bar 32a is held pivotably by the shaft hole 14a of the first base plate 14. An approximately arc-shaped movable contacting piece 35 made of an electrically conductive metal plate spring material is secured to the third movable piece 34 around the shaft hole 34b. When the third movable piece 34 is pivoted in a direction indicated by an arrow N or P, the movable contacting piece 35 is brought into contact with the fixed contacts 14d to activate, for example, "intermittent wiper," "wiper low speed" and "wiper high speed" modes one after another.

The movable base plate 24 is placed on the inner bottom plate 1d of the case 1, as indicated in FIG. 1, and supported pivotably by holding pivotably the shaft portion 24d in a shaft hole 50b formed in a covering member 50. When the first lever 3 is operated in a direction indicated by an arrow A or B, the movable base plate 24 is pivoted in a direction indicated by an arrow I or J around the shaft portion 24d together with the second lever 6. On the movable base plate 24 there is formed the protrusion 24c engaged with an engaging portion 37a of a fourth movable piece 37 on the lower surface thereof so as to protrude therefrom. The fourth movable piece 37 holds movable contact plates 39 through contact springs 38 on the lower surface thereof.

As indicated in FIG. 1, when the first lever 3 is operated by pivoting in a direction indicated by an arrow A or B, the movable base plate 24 is pivoted in a direction indicated by an arrow I or J and linked with the movable base plate 24, and the fourth movable piece 37 is moved in a direction indicated by an arrow S or T together with the movable contact plates 39. As indicated in FIG. 2, the fourth movable piece 37 is put between the lower surface of the inner bottom plate 1d of the thy case 1 and a base plane of the third base plate 40. The fourth movable piece 37 is guided by an edge 40a of the base plane of the third base plate 40 to be moved linearly in the direction indicated by the arrow S or T.

On the fourth movable piece 37 there are formed an engaging portion 37a consisting of two protruding pieces, between which the protrusion 24c is put, and blind holes (not shown), into which the contact springs 38 are inserted so that they can move into and out therefrom, are formed on the lower surface thereof. The movable contact plates 39 make a direction indicator work to lighten intermittently the direction indicator lamps by bringing them into contact with fixed contacts 41 on a third base plate 40.

As indicated in FIG. 1, the fixed contacts 41 and terminals 42 connected with the fixed contacts 41 are secured to the third base plate 40 by insert formation or the like. The third base plate 40 is inserted into an accommodating portion 10c in the pole plate 10, and the terminals 42 protrude from the lower part of the pole plate 10.

As indicated in FIG. 1, an opening portion 24e and a node body insertion pipe-shaped portion 24f are formed on the movable base plate 24. The opening portion 24e accommodates the base portion 6c of the second lever 6 on the side where the first lever 3 is disposed so that it can pivot in a desired angle region. A node spring 43 and a node body 44 are inserted into the node body insertion pipe-shaped portion 24f so that they can move into and out of the pipe-shaped portion 24f. The pipe-shaped portion 24f is disposed protrudingly on the side of the movable base plate 24 approximately opposite to the opening portion 24e. The node body 44 supports pivotably a roller 45 contacted with pressure with a node groove 1b at the extremity thereof.

The case 1 is closed by the covering member 50 secured by means of screws, putting the movable base plate 24, a cancel cam 46, a plate spring 47, a cam guide 48 and a coil spring 49 therebetween on the upper surface thereof, as indicated in FIG. 1. The lower face of the case 1 is closed by the pole plate 10, putting the push rod 7, the first movable piece 8, the first base plate 14, the terminal plate 15, the second base plate 32, the third movable piece 34, the second movable piece 29, and so forth therebetween. The case 1 accommodates the parts described above and is engaged with the body and secured by means of screws.

The cancel cam 46 has shafts 46a on the upper and lower sides thereof, as indicated in FIGS. 1 and 2. The shaft 46a on the lower side is inserted movably into the groove 24g formed in the movable base plate 24, while the shaft 46a on the upper side is inserted movably into an elongated hole 50a formed in the covering member 50. Two extremities of the plate spring 47 are held by the covering member 50. The plate spring 47 thrusts the cancel cam 46 with pressure by the central part thereof to energize the cancel cam. The cam guide 48 is placed on the movable base plate 24 and energized by a coil spring 49 toward the side of the cancel cam 46. The covering member 50 is engaged with the opening end on the upper side of the case 1.

The construction of the preferred embodiment of the present invention has been described above. The fabrication steps and the action of the present invention will now be described.

First, the shaft portion 27a of the arm body 27 is supported pivotably by the shaft supporting groove 1a and, at the same time, the thrusting portion 27c is disposed on the lower surface of the inner bottom plate 1d. The third movable piece 34, the movable contacting piece 35, the first movable piece 8, the contact spring 11 and the movable contact plate 12 are put between the second base plate 32 and the first base plate 14 and inserted into the opening portion 10a formed in the pole plate 10 together with the second movable piece 29, the contact spring 30 and the movable contact plate 31. The fourth movable piece 37, including the movable contact plate 39 and the contact spring 38, is placed on the third base plate 40. At the same time, the third base plate 40 is inserted into the accommodating portion 10c in the pole plate 10. Then, the opening portion 10a and the accommodating portion 10c are closed by the case 1.

The third lever 22 is made to pass through the pipe-shaped portion 6a from the base portion 6c in the second lever 6 so that the extremity portion 22e thereof protrudes from the pipe-shaped portion 6a. The push rod 7 is inserted into the pipe-shaped portion 24h in the movable base plate 24 so that the head portion 7a thereof is disposed at the opening end on the upper side of the pipe-shaped portion 24h. The mode spring 25 and the steel ball 26 are inserted into the node body disposing protrusion 6e in the second lever 6 and, at the same time, the shaft portion 6d is engaged with the shaft hole 24a so that the second lever 6 is supported pivotably by the movable base plate 24.

The node spring 16 and the steel ball 17 are inserted into the blind hole 3b in the first lever 3 and, at the same time, the pipe-shaped portion 6a of the second lever 6 is inserted into the pipe-shaped portion 18b in the fixing body 18 through the boot 5 and the first lever 3. The second lever 6 is engaged with the end surface of the cylindrical pipe-shaped portion 18b in the cavity 18d of the fixing body 18 by means of the elastic engaging nail 6b. The key 6g is engaged within the cylindrical pipe-shaped portion 18b. In this way, the second lever 6 is secured to the fixing body 18, and the first lever 3 is supported pivotably by the pipe-shaped portion 6a.

The node spring 19 and the steel ball 20 are inserted into the blind hole 18g in the fixing body 18. The protrusion 4b of the pivoting knob 4 is inserted into the transversal groove 18h in the fixing body 18 and the protrusion 4b is moved to the cavity 18d. The pin 23 is made to pass through the through hole 4c in the pivoting knob 4, and the pin 23 is inserted into the hole 22d. In this way the pivoting knob 4 is linked with the third lever 22, and they are pivoted together.

The engaging portion 18c of the fixing body 18 is mounted on the fixed knob 21 by insertion. The fixed knob 21 is secured to the fixing body 18 by engaging the engaging piece 21a with the nail 18f so that the pivoting knob 4 is prevented from falling off from the fixing body 18.

The node spring 43, the node body 44, the roller 45, the coil spring 29 and the cam guide 48 are placed on the movable base plate 24. The movable base plate 24 is inserted into the case 1 to the inner bottom plate 1d and, at the same time, the protrusion 1c is engaged with the through hole 5a of the boot 5. The cancel cam 46 and the plate spring 47 are placed on the covering member 50, and the shaft portion 24d is engaged pivotably with the shaft hole 50b. At the same time, the covering member 50 is engaged with the upper portion of the case 1 and secured thereto by means of screws. The mounting is terminated in this way.

Since the engaging portion 22b protrudes obliquely downward with respect to the center line of the third lever 22, and the engaging portion 22b is so formed that the thickness of teeth t1 on the side of the shaft bar 22c is greater than the thickness of teeth t2 on the side of the case 1, when the manipulation rod 22a is fabricated in one body with the third lever 22 by means of metal dies, a die pin can be extracted in the direction of the center line of the third lever 22. In this way, it is possible to fabricate the manipulation rod 22a in one body with the third lever 22 by means of metal dies.

A lever switch provided with three lever members, i.e., the first lever 3, the second lever 6 and the third inner lever 22, has been described above as a preferred mode for carrying out the present invention. However, the present invention may also be applied to a lever switch having only two lever members, i.e., the first lever 3 and the third lever 22. The present invention may relate to a lever switch having two lever members, i.e., a pipe-shaped lever member, in which the first lever 3 and the second lever 6 are formed in one body, and another lever member, in which the third lever 22 is inserted pivotably into the pipe-shaped lever member. In this case, the third lever 22 functions as described previously.

When the pivoting knob 4 is operated by pivoting in the direction indicated by the arrow G, the third lever 22 supported pivotably by the pivoting knob 4 is pivoted in the direction indicated by the arrow Y. The third lever 22 and the manipulation rod 22a are pivoted together, which makes the third movable piece 34 pivot in the direction indicated by the arrow N. The movable contacting piece 35 is pivoted together with the third movable piece 34 to be brought into contact with the fixed contacts 14d so that the wiper is driven intermittently. Further, when the pivoting knob 4 is operated by pivoting in the direction indicated by the arrow E, the speed of the wiper is switched over to "High."

The third lever 22 has a toothed-wheel-shaped manipulation rod 22a consisting of a number of protrusions. The third movable piece 34 consists of a toothed-wheel-shaped member having an engaging portion 34a engaged with the manipulation rod 22a. In this way, even if the pivoting knob 4 is pivoted largely in the direction indicated by the arrow E or F, the engaging portion 22b of the manipulation rod 22a is always engaged with the engaging portion 34a of the third movable piece 34. Therefore, the pivoting angle of the pivoting knob can be great. Since the distance over which the movable contacting piece 35 of the third movable piece 34 moves can be great, the number of the fixed contacts 14d can be increased. Therefore, one pivoting knob 4 can be a wiper switch, which can switch over a wiper device to "Stop," "Intermittent," "Low Speed" and "High Speed."

When the pivoting knob 4 is operated by pivoting in the direction indicated by the arrow H, the third lever 22 and the manipulation rod 22a are pivoted in the direction indicated by the arrow Z. The movable contacting piece 35 is pivoted in the direction indicated by the arrow P together with the third movable piece 34 engaged with the manipulation rod 22a to switch over the wiper switch from the "High Speed" position to the "Low Speed" position, the "Intermittent" position, and the "OFF" position one after another. The wiper is stopped when it returns to its original OFF position.

When the first lever 3 is operated by raising it in the direction indicated by the arrow C, the first lever 3, the second lever 6, and the third lever 22 are pivoted around the shaft portions 6d. Even if the third lever 22 is operated by pivoting in the direction indicated by the arrow C or D, since the engaging portion 22b of the manipulation rod 22a is engaged with the engaging portion 34a of the third movable piece 34 over a long length, they are never separated from each other. The contacting portion 27b of the arm body 27 is thrust by the thrusting surface 6f of the second lever 6 and pivoted in the direction indicated by the arrow T around the shaft portion 27a.

The contacting portion 27b and the thrusting portion 27c are pivoted by an angle θ° in the directions indicated by the arrows U and V around the shaft portion 27a with a radius of length L2 from the shaft portion 27a to the thrusting portion 27c. When the contacting portion 27b is pushed over a length S1, as indicated in FIG. 8, the thrusting portion 27c is moved over a length S2, which is greater than the length S1. The stroke, i.e., the displacement distance, of the thrusting surface 6f of the second lever 6, which is enlarged by the arm body 27 to be transmitted and the second movable piece 29, descends largely in the direction indicated by the arrow Q so that the switches "Passing" and "Main-Dimmer" are opened and closed.

Owing to the fact that the stroke, i.e., the displacement distance, of the second movable piece 29 is elongated, the fixed contact for "Passing" 32c and the fixed contact for "Main-Dimmer" 32c, with which the movable contacts 31 are brought into contact, can be positioned on the movable contact plate 31 with a wide interval. In this way it is possible to eliminate contact defects and to make the second movable piece 29 and the whole combination switch 2 smaller.

When the first lever 3 is operated in the direction indicated by the arrow A, the first lever 3, the second lever 6, the third lever 22 and the movable base plate 24 are pivoted around the shaft portion 24d. Even if the third lever 22 is operated by pivoting in the direction indicated by the arrows A or B, since the engaging portion 22b of the manipulation rod 22a is engaged with the engaging portion 34a of the third movable piece 34 over a long length, they are never separated from each other. The movable base plate 24 is pivoted in the direction indicated by the arrow I, and the protrusion 24c disposed on the lower surface thereof makes the fourth movable piece 37 move in the direction indicated by the arrow S.

The movable base plate 24 is guided by the edge 40a of the third base plate 40 and moved linearly in the direction indicated by the arrow S. In this way, the direction indicator lamps are lightened intermittently. When the first lever 3 is operated in the opposite direction indicated by the arrow B, the different members are moved in directions opposite to those described for the direction indicated by the arrow A.

When the first lever 3 is operated by pivoting in the direction indicated by the arrow E, the first lever 3 is pivoted around the axial center line of the third lever 22. The manipulation rod 3a is pivoted in the direction indicated by the arrow E together with the first lever 37, which lowers the push rod 7. The push rod 7 lowers the first movable piece 8 and the movable contact plate 12 in the direction indicated by the arrow K, and the movable contact plate 12 is brought into contact with the fixed contacts 14e to drive the wiper washer.

When an operator lets go his hold of the first lever 3, the steel ball 17 energized by the node spring 16 is guided by the node groove formed in the fixing body to be moved, and the first lever 3 returns to its original OFF position. Energized by the returning spring 9, the push rod 7 and the first movable piece 8 return to their original positions, and the wiper washer is stopped.

Since the present invention is constructed as explained above, the following effects and advantages can be obtained.

According to a first aspect of the invention, a lever switch is provided that includes a pivoting knob, an inner lever having the pivoting knob fixed at an extremity thereof and a manipulation rod at another extremity thereof, and a second lever having a pipe-shaped portion, through which a shaft bar of the inner lever passes. Since the inner lever is formed in one body with the manipulation rod, and the manipulation rod has a toothed-wheel-shaped engaging portion at another extremity portion, it is possible to decrease the number of parts and the number of mounting steps and to lower the fabrication cost of the lever switch.

According to another aspect of the invention, since the toothed-wheel-shaped engaging portion has teeth portions having different thicknesses (t1 and t2), it is possible to extract a die pin in a direction of an axial center line of the inner lever, which makes it possible to form the inner lever in one body with the manipulation rod.

According to yet another aspect of the invention, since the thickness (t1) of the teeth (t1) on the side of the shaft bar is greater than the thickness (t2) of the teeth on the side of the case, when the manipulation rod having the engaging portion is formed in one body with the inner lever by means of metal dies, it is possible to extract a metal die pin in a transversal direction, which makes the metal die work simpler.

According to yet another aspect of the invention, since the toothed-wheel-shaped engaging portion of the inner lever is formed so as to protrude in a direction inclined with respect to a center line of the shaft bar, it is possible to improve the engagement between the engaging portion of the inner lever pivoting upward and downward and the engaging portion of the movable piece.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch for a vehicle, comprising:

a pivoting knob;

an inner lever having said pivoting knob fixed at a rear extremity thereof and a manipulation rod at a front extremity thereof; and a second lever having a pipe-shaped portion, through which a shaft bar of said inner lever passes;

wherein said inner lever is formed in one body with said manipulation rod, and said manipulation rod has a toothed-wheel-shaped engaging portion at an extremity portion thereof; and wherein said toothed-wheel-shaped engaging portion has a plurality of tapered teeth protruding radially outwardly from said manipulation rod, said teeth each having a rear side facing said rear extremity of said inner lever and a front side facing away from said rear extremity of said inner lever, and each of said teeth having a thickness that tapers from a greater thickness (t1) on said rear side to a smaller thickness (t2) on said front side.

2. The lever switch for a vehicle according to claim 1, wherein said toothed-wheel-shaped engaging portion of said inner lever protrudes radially outwardly and forwardly from said manipulation rod in a direction inclined with respect to a center line of said shaft bar.

3. A lever switch for a vehicle, comprising:

a pivoting knob;

an inner lever having first and second ends, said pivoting knob being fixed to said first end of the inner lever, and a manipulation rod being formed integral with said second end of the inner lever, said manipulation rod having a first toothed-wheel-shaped engaging portion at an end thereof for engaging a corresponding second toothed-wheel-shaped engaging portion of a movable piece, and said inner lever being supported for rotational movement about a longitudinal axis of said inner lever for moving said movable piece; and a second lever having a pipe-shaped portion, through which a shaft bar of said inner lever passes;

wherein said first toothed-wheel-shaped engaging portion has a plurality of tapered teeth protruding radially outwardly from said manipulation rod, said teeth each having a rear side facing said first end of said inner lever and a front side facing away from said first end of said inner lever and each of said teeth having a thickness that tapers from a greater thickness (t1) on said rear side to a smaller thickness (t2) on said front side.

4. The lever switch for a vehicle according to claim 3, wherein said toothed-wheel-shaped engaging portion of said inner lever protrudes radially outwardly and forwardly from said manipulation rod in a direction inclined with respect to a center line of said shaft bar.

* * * * *